(12) United States Patent
Song et al.

(10) Patent No.: US 9,639,181 B2
(45) Date of Patent: May 2, 2017

(54) PORTABLE HAPTIC FEEDBACK CAPACITIVE STYLUS FOR INTERACTION ON MOBILE TERMINAL

(71) Applicant: SOUTHEAST UNIVERSITY, Nanjing (CN)

(72) Inventors: Aiguo Song, Nanjing (CN); Yezhen Han, Nanjing (CN); Juan Wu, Nanjing (CN); Lu Wang, Nanjing (CN); Lei Tian, Nanjing (CN); Haihua Hu, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 14/907,289

(22) PCT Filed: Aug. 12, 2014

(86) PCT No.: PCT/CN2014/084154
§ 371 (c)(1),
(2) Date: Jan. 25, 2016

(87) PCT Pub. No.: WO2015/139411
PCT Pub. Date: Sep. 24, 2015

(65) Prior Publication Data
US 2016/0188015 A1    Jun. 30, 2016

(30) Foreign Application Priority Data

Mar. 18, 2014  (CN) .......................... 2014 1 0099125

(51) Int. Cl.
*G06F 3/03*      (2006.01)
*G06F 3/0354*    (2013.01)
(Continued)

(52) U.S. Cl.
CPC .......... *G06F 3/03545* (2013.01); *G06F 3/016* (2013.01); *G06F 3/0383* (2013.01); *G06F 3/0414* (2013.01); *G06F 3/044* (2013.01)

(58) Field of Classification Search
CPC combination set(s) only.
See application file for complete search history.

(56) References Cited

U.S. PATENT DOCUMENTS 3,591,824 A * 7/1971 Hanbicki ................. G09G 1/14
                                                              315/385
8,773,405 B1 * 7/2014 Ryshtun .............. G06F 3/03545
                                                             178/19.03
(Continued)

FOREIGN PATENT DOCUMENTS

CN    101339470 A    1/2009
CN    102253717 A    11/2011
(Continued)

*Primary Examiner* — Van Chow
(74) *Attorney, Agent, or Firm* — Gokalp Bayramoglu

(57) ABSTRACT

Disclosed is a portable haptic feedback capacitive stylus for interaction on a mobile terminal, composing a tip, a sleeve ring, a first housing, a connecting cylinder, a second housing, an end-portion housing, a motor, a spring, a slider, a screw rod, a photoelectric code disc, a measurement and control module, a vibration touch module, and a power supply. The first housing comprises a front housing and a rear housing, and a limiting groove is disposed in an inner wall of the first housing. The tip is fixedly connected to one end of the connecting cylinder, and the other end of the connecting cylinder passes through an end-portion throughhole of the front housing.

12 Claims, 4 Drawing Sheets

(51) Int. Cl.
*G06F 3/01* (2006.01)
*G06F 3/038* (2013.01)
*G06F 3/041* (2006.01)
*G06F 3/044* (2006.01)

(56) References Cited

U.S. PATENT DOCUMENTS

| | | | |
|---|---|---|---|
| 2001/0006383 A1* | 7/2001 | Fleck | G06F 3/03545 345/179 |
| 2005/0248549 A1 | 11/2005 | Dietz et al. | |
| 2009/0315860 A1 | 12/2009 | Lee et al. | |
| 2013/0147748 A1* | 6/2013 | Westerinen | G06F 3/016 345/173 |

FOREIGN PATENT DOCUMENTS

| | | |
|---|---|---|
| CN | 102508561 A | 6/2012 |
| CN | 103885615 A | 6/2014 |

* cited by examiner

PORTABLE HAPTIC FEEDBACK CAPACITIVE STYLUS FOR INTERACTION ON MOBILE TERMINAL

BACKGROUND OF THE INVENTION

Field of the Invention

The present invention relates to a human-computer interaction device, and more particularly, to a portable haptic feedback capacitive stylus for interaction on a mobile terminal, which achieves haptic interaction between humans and the mobile terminal.

Description of Related Art

Haptic sense is a collective term for force sense and tactile sense. Tactile sense is a feeling related to a touch, caused by a mechanical stimulus such as pressure and vibration. Force sense is a body feeling, caused by internal forces and motion of muscles and hones. When a person touches an object, he/she can obtain a haptic feeling of pressure sense, flexibility, and texture of the object. Although the main way by which people get information is visual sense and auditory sense, haptic sense plays an irreplaceable role: firstly, haptic sense is an important channel to obtain information. When a person interacts with the environment, he/she can achieve a better understanding of the shape, material, texture and other properties of an object by touching. In particular, where visual sense or auditory sense is limited, current information may be characterized by using haptic interaction. Secondly, haptic sense is an effective means to achieve precise operation and control. For example, when telerobots interact with the environment, an operator can accurately accomplish his/her tasks only by a prompt of the position of the sensed object by means of haptic sense.

As a personal computing and communication device which is rapidly growing, a mobile terminal recently has entered into a stage of intelligent development and the function of its human-computer interaction interface currently mainly focuses on visual and auditory interaction, with haptic function being limited. Haptic reproduction and interaction technology is an emerging human-computer interaction technology. The technology enables an operator to touch, perceive and manipulate a virtual object, to achieve an active exploration on a virtual environment, which expands conventional human-computer interaction modes and further improves the quality of human-computer interaction. Using the haptic reproduction and interaction technology in a mobile terminal can expand the function and application scope of the mobile terminal, expand user populations (for example, people with visual and auditory disabilities), and enhance feelings of presence, and thus has broad application prospects and market value.

Currently, domestic and foreign haptic stylus interaction devices only can give an operator with a simple tactile prompt by vibration and cannot give continuous force feedbacks, so that a three-dimensional shape of an object in a screen is difficult to percept by touching. The present device is combined with the mobile terminal technology to achieve an effective portable haptic interaction capacitive stylus device, which not only can achieve vibration touch feedback prompts at a controlled frequency, but also can generate continuous force feedbacks, thereby filling a current hole in the field of haptic human-computer interaction on a mobile terminal.

SUMMARY OF THE INVENTION

Technical Problem

The technical problem to be solved by the present invention is to provide a haptic feedback capacitive stylus for interaction on a mobile terminal, which solves a problem that haptic interaction on a mobile terminal is difficult to implement, and can generate continuous force feedbacks.

Technical Solution

In order to solve the technical problem mentioned above, the present invention adopts the following technical solution:

A portable haptic feedback capacitive stylus for interaction on a mobile terminal, comprising a tip, a sleeve ring, a first housing, a connecting cylinder, a second housing, an end-portion housing; a motor, a spring, a slider, and a screw rod, located in the first housing; and a photoelectric code disc, a measurement and control module, and a power supply, located in the second housing. The second housing is fixedly connected between the first housing and the end-portion housing. The first housing comprises a front housing and a rear housing fixedly connected to the front housing, an outer diameter of the front housing is smaller than an outer diameter of the rear housing, and a limiting groove is disposed in an inner wall of the first housing. The tip is fixedly connected to one end of the connecting cylinder, and the other end of the connecting cylinder passes through an end-portion through-hole of the front housing to be within the front housing, and a cylinder diameter of the connecting cylinder is smaller than a diameter of the end-portion through-hole of the front housing. The sleeve ring is sleeved over the front housing, and the sleeve ring is axially movable along the front housing. A clearance fit is provided between the sleeve ring and the connecting cylinder. One end of the screw rod is connected in the connecting cylinder through a bearing, and the other end of the screw rod is connected to an output shaft of the motor. The slider is sleeved over the screw rod, the slider and the screw rod fit each other, and a lug is provided on the slider and the lug is located in the limiting groove of the first housing. One end of the spring is connected to the slider, and the other end of the spring is connected to the sleeve ring. The photoelectric code disc is connected to the motor, the measurement and control module is separately connected to the photoelectric code disc and the motor, and the power supply supplies power to the measurement and control module and the motor.

Further, the tip, the connecting cylinder, the bearing, the sleeve ring, the spring, the slider, the screw rod, and the first housing all are made of a conductive material.

Further, the second housing and the end-portion housing both are made of a nonmetallic material.

Further, the measurement and control module comprises a wireless communication circuitry, a control circuitry, and a power supply management circuitry. The control circuitry is separately connected to the wireless communication circuitry and the power supply management circuitry via conducting wires. The power supply management circuitry is connected to the power supply via conducting wires. The wireless communication circuitry is communicatively connected to a wireless communication module in the mobile terminal. The wireless communication circuitry is used for receiving data from the mobile terminal and transmitting data to the mobile terminal.

Further, the portable haptic feedback capacitive stylus for interaction on a mobile terminal is characterized by further comprising a vibration touch module. The vibration touch module is located in the second housing, the power supply supplies power to the vibration touch module, and the vibration touch module is connected to the measurement and control module via conducting wires.

Further, the sleeve ring comprises an outer ring, an inner ring, mounting holes, and supporting blocks. The inner ring is located in the outer ring, the outer ring and the inner ring are fixedly connected to each other through the supporting blocks, and one of the mounting holes is provided on each of the supporting blocks. One end of the spring is sleeved in the mounting holes. The first housing is located in a gap between the outer ring and the inner ring, the connecting cylinder is located in a cavity of the inner ring, and a gap is provided between the connecting cylinder and the inner ring.

Further, open slots are provided on the front housing, a clearance fit is provided between the open slots and the supporting blocks of the sleeve ring, and one end of the first housing passes through the gap between the outer ring and the inner ring of the sleeve ring to be threadedly connected to the tip.

Further, a length of the open slots is greater than a length of the supporting blocks.

Further, two supporting blocks are provided and arranged between the outer ring and the inner ring opposite to each other. Two open slots are provided on the front housing. A clearance fit is provided between each of the supporting blocks and one of the open slots.

Advantageous Effect

The present invention has the following advantages, compared to the prior art:

(1) The present invention designs a capacitive stylus with haptic feedback function for interaction on a mobile terminal. When the capacitive stylus is held by a human hand to move on a screen of the mobile terminal, a spring of the capacitive stylus deforms under the action of a motor, to generate elastic force feedbacks at the human hand, whereby the human hand can feel three-dimensional information such as a contour, concavity and convexity of an image displayed on the screen. In addition, using a vibration touch module of the capacitive stylus to generate various modes of vibration can enhance marginal information of the image, thereby achieving the effect of collision motion. Using the motor to drive deformation of the spring to generate elastic force feedbacks can achieve the effect of damped motion, which expands tactile human-computer interaction modes of the mobile terminal and fills a current hole in the field of haptic human-computer interaction on a mobile terminal.

(2) The haptic feedback capacitive stylus of the present invention uses a slider and screw rod mechanism, a rotating speed and a number of rotations of the motor are controlled by a control circuitry, to cause the slider to be displaced by a certain amount, resulting in deformation of the spring, such that the effect of respective force feedbacks is generated at the human hand, and by calculating the movement speed and displacement of the slider, force feedbacks of the capacitive stylus can be continually and precisely controlled. Hence, the haptic feedback capacitive stylus of the present invention can generate continuous and controlled force feedbacks.

(3) Point-to-point interaction is achieved between the haptic feedback capacitive stylus designed by the present invention and the mobile terminal in a wireless communication mode, without limitation from interfaces of the mobile terminal. The haptic feedback capacitive stylus can be adapted for any mobile terminal with the same type of a wireless communication module, and has wide application scope, is easy to use and has bright market prospects.

(4) The haptic feedback capacitive stylus designed by the present invention adapts a wireless communication mode, and has a mechanical structure in a linear arrangement which is simple and compact to facilitate installment in a pen shell. The capacitive stylus has a small volume and a light weight, and has good portability and mobility.

Figure 1:
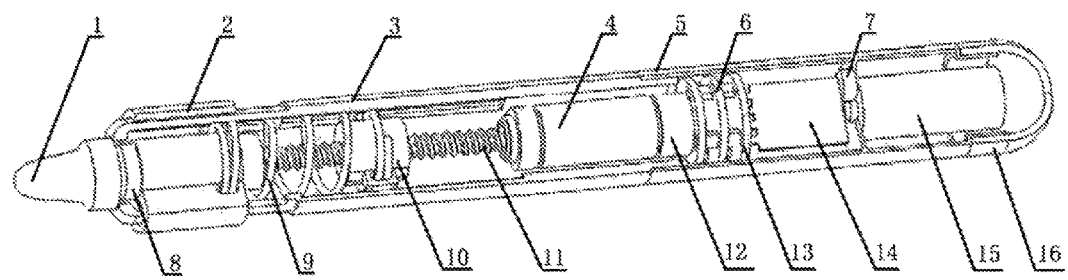
FIG. 1 is an overall perspective view of the present invention.

In the figures: 1. tip, 2. sleeve ring, 3. first housing, 4. motor, 5. second housing, 6. control circuitry, 7. vibration touch module, 8. connecting cylinder. 9. spring, 10. slider, 11. screw rod, 12. photoelectric code disc, 13. power supply management circuitry, 14. wireless communication circuitry, 15. power supply, 16. end-portion housing, 17, bearing, outer ring 201, inner ring 202, mounting hole 203, supporting block 204, open slot 301, limiting groove 302.

DETAILED DESCRIPTION OF THE INVENTION

The present invention is further explained below in connection with the accompanying drawings.

Figure 2:
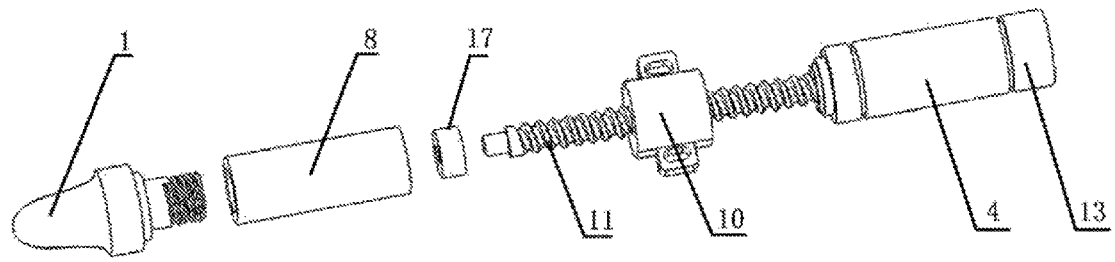
FIG. 2 is a partially exploded view of the present invention.

As shown in FIG. 1 and FIG. 2, a portable haptic feedback capacitive stylus for interaction on a mobile terminal comprises a tip 1, a sleeve ring 2, a first housing 3, a connecting cylinder 8, a second housing 5, an end-portion housing 16; a motor 4, a spring 9, a slider 10, and a screw rod 11, located in the first housing 3; and a photoelectric code disc 12, a measurement and control module, and a power supply 15, located in the second housing 5. The second housing 5 is fixedly connected between the first housing 3 and the end-portion housing 16. The first housing 3 comprises a front housing and a rear housing fixedly connected to the front housing, an outer diameter of the front housing is smaller than an outer diameter of the rear housing, and a limiting groove 302 is disposed in an inner wall of the first housing 3. The tip 1 is fixedly connected to one end of the connecting cylinder 8, and the other end of the connecting cylinder 8 passes through an end-portion through-hole of the front housing to be within the front housing, and a cylinder diameter of the connecting cylinder 8 is smaller than a diameter of the end-portion through-hole of the front housing. The sleeve ring 2 is sleeved over the front housing, and the sleeve ring 2 is axially movable along the front housing. A clearance fit is provided between the sleeve ring 2 and the connecting cylinder 8. One end of the screw rod 11 is connected in the connecting cylinder 8 through a bearing 17, and the other end of the screw rod 11 is connected to an output shaft of the motor 4. The slider 10 is sleeved over the screw rod 11, the slider 10 and the screw rod 11 fit each other, and a lug is provided on the slider 10 and the lug is located in the limiting groove 302 of the first housing 3. One end of the spring 9 is connected to the slider 10, and the other end of the spring 9 is connected to the sleeve ring 2. The photoelectric code disc 12 is connected to the motor 4, the measurement and control module is separately connected to the photoelectric code disc 12 and the motor 4, and the power supply 15 supplies power to the measurement and control module and the motor 4. The measurement and control module is used for communicating with a wireless module of the mobile terminal and controlling operation of the motor 4 according to instructions transferred from the mobile terminal, thereby controlling movement of the spring 9. The measurement and control module manages the power supply 15 for supplying power to the capacitive stylus.

In the haptic feedback capacitive stylus of the structure described above, the slider 10 is limited by the limiting groove 302 of the first housing 3, the slider 10 and the sleeve ring 2 are connected to each other with the spring 9, and the end of the screw rod 11 is connected to the output shaft of the motor 4. By reading information from the photoelectric code disc 12 and a rotating speed of the motor 4, a displacement of the slider 10 can be calculated. Changes in displacement of the slider 10 lead to deformation of the spring 9, and thus changes in continuous force feedbacks can be generated at the sleeve ring 2 hold by fingers.

Further, the tip 1, the connecting cylinder 8, the bearing 17, the sleeve ring 2, the spring 9, the slider 10, the screw rod 31, and the first housing 3 all are made of a conductive material. This facilitates to conduct charges in a human hand to the tip when the hand holds the sleeve ring 2.

Further, the second housing 5 and the end-portion housing 16 both are made of a nonmetallic material. This ensures that a signal sent from a wireless communication circuitry 14 is not shielded.

Further, the measurement and control module comprises the wireless communication circuitry 14, a control circuitry 6, and a power supply management circuitry 13. The control circuitry 6 is separately connected to the wireless communication circuitry 14 and the power supply management circuitry 13 via conducting wires. The power supply management circuitry 13 is connected to the power supply 15 via conducting wires. The wireless communication circuitry 14 is communicatively connected to the wireless communication module in the mobile terminal. The wireless communication circuitry 14 is used for receiving data from the mobile terminal and transmitting data to the mobile terminal. The control circuitry 6 is used for controlling the rotating speed of the motor 4 and vibration frequency and time of a vibration touch module 7 according to information sent back from the wireless communication circuitry 14, and reading the number of rotations of the motor 4 and transmitting it to the mobile terminal via the wireless communication circuitry 14. The power supply management circuitry 13 is capable of detecting electric quantity of the power supply 15, and protecting the power supply 15 from being overcharged in charging and preventing over-discharging of the power supply 15 in use.

For the wireless communication circuitry 14, a common Bluetooth module, for example, HC05, may be used. For the control circuitry 6, a STM32 microprocessor may be used as a core, in combination with a DRV8830 chip-driven motor from TL For the power supply management circuitry 13, a bq3060 chip from TI (Texas Instruments) may be used. The key point of the present invention does not lie in selection of these chips of specific models, and all existing chips capable of achieving its function may be used in the present invention.

Further, the portable haptic feedback capacitive stylus for interaction on a mobile terminal further comprises a vibration touch module 7. The vibration touch module 7 is located in the second housing 5, the power supply 15 supplies power to the vibration touch module 7, and the vibration touch module 7 is connected to the measurement and control module via conducting wires. The vibration frequency and time of the vibration touch module 7 can be controlled by the control circuitry 6 in the measurement and control module through an electrical signal. The vibration touch module 7 is used for generating vibration touch feedbacks of different frequencies and different durations.

Figure 3:
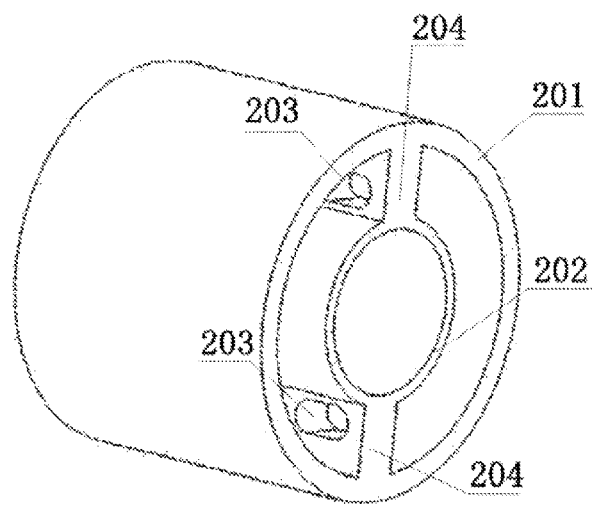
FIG. 3 is a perspective view of a sleeve ring of the present invention.

Further, as shown in FIG. 3, the sleeve ring 2 is a ring-shaped structure, and specifically comprises an outer ring 201, an inner ring 202, mounting holes 203, and supporting blocks 204. The inner ring 202 is located in the outer ring 201, the outer ring 201 and the inner ring 202 are fixedly connected to each other through the supporting blocks 204, and one of the mounting holes 203 is provided on each of the supporting blocks 204. One end of the spring 9 is sleeved in the mounting holes 203. The first housing 3 is located in a gap between the outer ring 201 and the inner ring 202, the connecting cylinder 8 is located in a cavity of the inner ring 202, and a gap is provided between the connecting cylinder 8 and the inner ring 202. In a normal pen-holding mode, a forefinger and a thumb of a person hold the outer ring 201.

Figure 4:
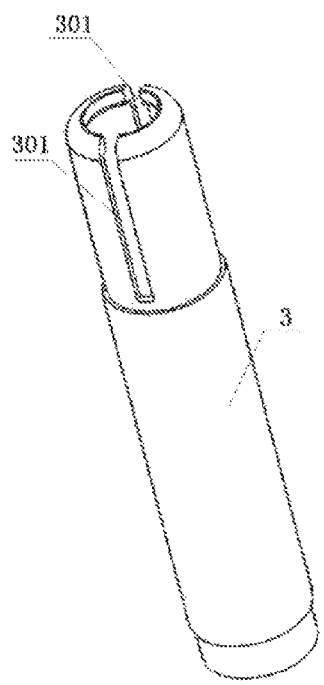
FIG. 4 is a perspective view of a first housing of the present invention.
Figure 5:
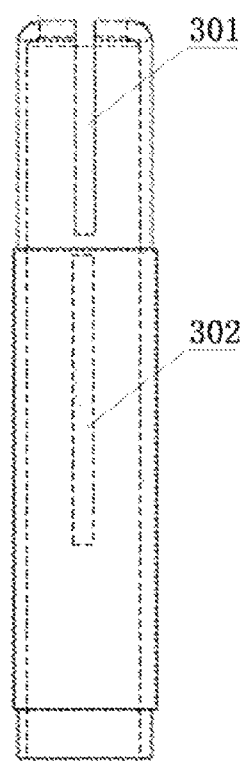
FIG. 5 is a front view of the first housing of the present invention.

Further, as shown in FIG. 4 and FIG. 5, preferably, the first housing 3 is cylinder-shaped. The first housing 3 comprises a front housing and a rear housing, open slots 301 are provided on the front housing, and a limiting groove 302 is provided in an inner wall of the front housing. The limiting groove 302 is used for limiting the slider 10, such that the slider 10 only can linearly move along the limiting groove 302 when rotating over the screw rod 11. A clearance fit is provided between the open slots 301 and the supporting blocks 204 of the sleeve ring 2, such that an end of the first housing 3 can pass through the gap between the inner ring 202 and the outer ring 201 of the sleeve ring 2 to be threadedly connected to the tip 1. A length of the open slots 301 is greater than a length of the supporting blocks 204, such that the sleeve ring 2 is movable along the open slots 301.

Preferably, two supporting blocks 204 are provided and arranged between the outer ring 201 and the inner ring 202 opposite to each other. Two open slots 301 are provided on the front housing. A clearance fit is provided between each of the supporting blocks 204 and one of the open slots 301.

Figure 6:
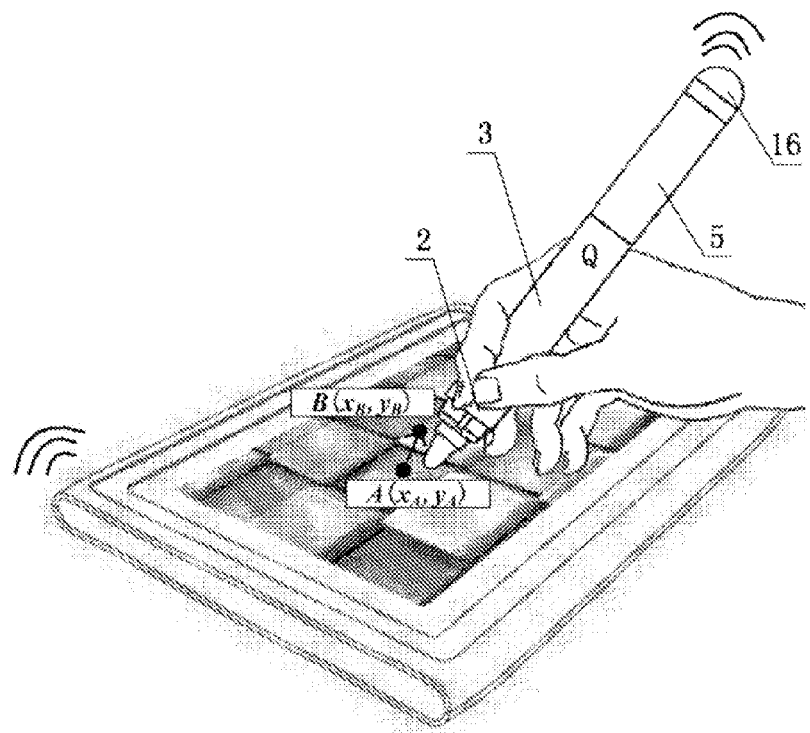
FIG. 6 is a state-of-use view of the present invention.

As shown FIG. 6, in use of the haptic feedback capacitive stylus of the present invention, a human hand holds the haptic feedback capacitive stylus in a normal pen-holding mode, where a forefinger and a thumb hold the sleeve ring 2, an end of the forefinger is contacted with the first housing 3, as shown by a point Q in FIG. 6. According to the present invention, the tip 1, the connecting cylinder 8, the bearing 17, the sleeve ring 2, the spring 9, the slider 10, the screw rod 11, and the first housing 3 all are made of a conductive material. Thus, for the normal pen-holding mode, charges in the human hand can be smoothly conducted to the tip 1 of the haptic feedback capacitive stylus. The wireless communication circuitry 14 of the present invention is installed inside the second housing 5. Because the second housing 5 and the end-portion housing 16 both are made of a nonmetallic material, it can be ensured that a signal sent from the wireless module is not shielded.

Figure 7:
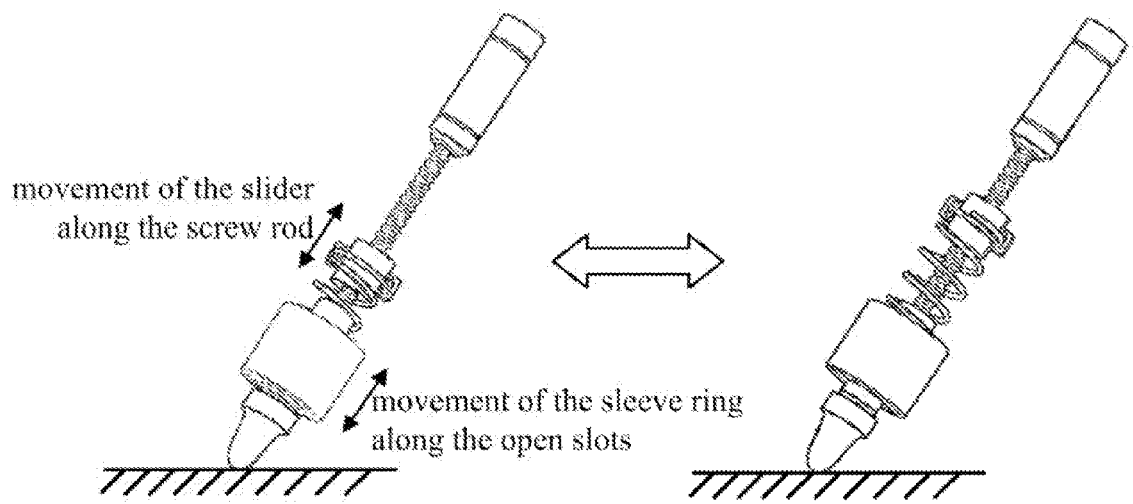
FIG. 7 is a deformation view of a spring of the present invention in operation.

Referring to FIG. 7, a deformation view of a spring of a haptic feedback mechanism in the haptic feedback capacitive stylus of the present invention is shown. The motor 4 rotates to drive the screw rod 11 to rotate, and thus the slider 10 is moved upward and downward along the screw rod 11, thereby driving the spring 9 to deform. The sleeve ring 2 can move upward and downward in the open slots 301 of the first housing 3, also resulting in deformation of the spring 9. Thus, the total deformation amount of the spring 9 is made up of two portions, a deformation amount of the spring 9 caused by the movement of the sleeve ring 2 and a deformation amount of the spring 9 caused by the movement of the slider 10. However, the deformation amount of the spring 9 caused by the movement of the sleeve ring 2 is much smaller than the deformation amount of the spring 9 caused by the movement of the slider 10, so the deformation amount of the spring 9 caused by the movement of the sleeve ring 2 is negligible.

Figure 8:
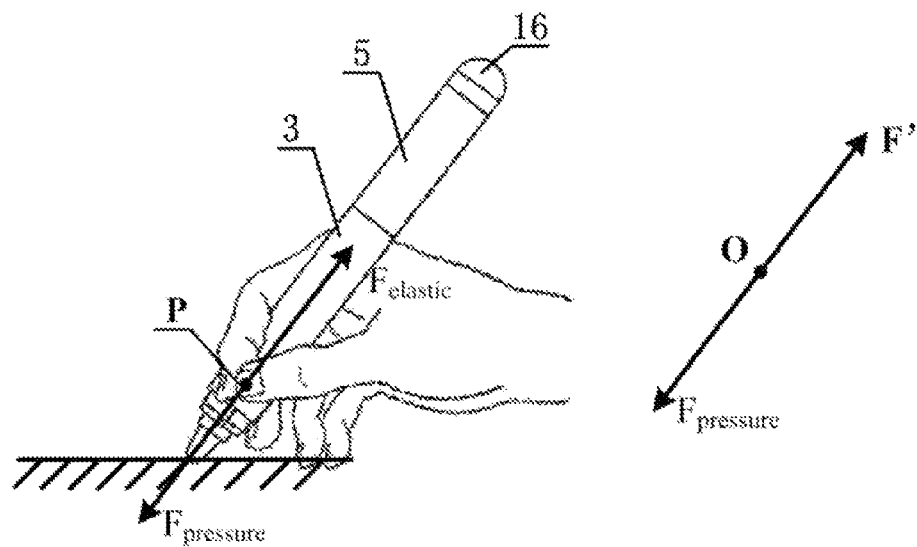
FIG. 8 is a force analysis diagram of a contact point of a capacitive stylus and a human hand according to the present invention in operation.

Referring to FIG. 8, a force analysis diagram of haptic feedback according to the present invention is shown. A human hand holds the sleeve ring 2. Firstly, a force analysis is performed for the sleeve ring 2. A point P is an action point, and a force being acted upon the human hand is an elastic force $F_{elastic}$ resulting from deformation of the spring, and simultaneously, the sleeve ring 2 is subjected to a pressure $F_{pressure}$ from the human hand. The $F_{elastic}$ and the $F_{pressure}$ are an interactive pair, and $F_{elastic}=F_{pressure}$, having opposite directions. Secondly, a force analysis is performed for the haptic feedback capacitive stylus as a whole. The haptic feedback capacitive stylus is totally marked as O (which means that the overall capacitive stylus is regarded as a mass point for analysis of an external force, without considering the acting force of the spring inside the capacitive stylus), the capacitive stylus is subjected to the pressure $F_{pressure}$ from the human hand and a force F' in a direction of the capacitive stylus, applied by a screen of the mobile terminal onto the capacitive stylus, where $F_{pressure}=F'$. Thus, it can be concluded that: $F'=F_{pressure}=F_{elastic}=k\cdot\Delta X$, wherein k is an elastic coefficient of the spring 9, and $\Delta X$ is a deformation amount of the spring 9. When changes in $\Delta X$ occur, the human hand holding the sleeving ring 2 can feel changed haptic feedbacks.

Figure 9:
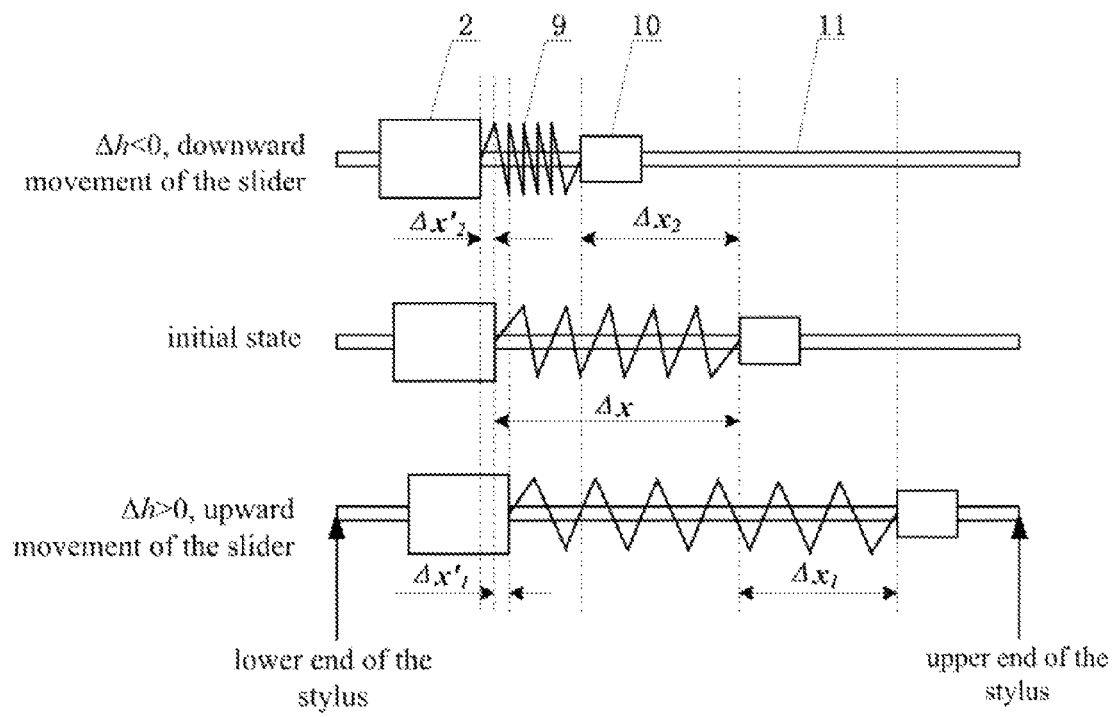
FIG. 9 is a schematic diagram of deformation of the spring according to the present invention in operation.

As shown in FIG. 6, FIG. 7, FIG. 8, and FIG. 9, the haptic feedback capacitive stylus is held by the human hand to move on a surface of a capacitive screen of the mobile terminal. The operation process of the haptic feedback capacitive stylus is illustrated with movement from a point A to a point B in FIG. 6 as an example: in an initial state, when contacting with the screen in a normal pen-holding mode, F'>0, and it can be known from $F'=k\cdot\Delta X$ that, an initial deformation amount of the spring 9 is $\Delta X=\Delta x>0$, namely, the spring 9 is in an elongated condition in the initial state. When the haptic feedback capacitive stylus slides from the point A to the point B, the mobile terminal can obtain coordinate information of the point A $(x_A, y_A)$ and coordinate information of the point B $(x_B, y_B)$ according to changes in capacitance of the screen. According to the coordinate information of the two points, upper computer software can calculate height information $h_A$ of an image at the A coordinate $(x_A, y_A)$ and height information $h_B$ of an image at the B coordinate $(x_B, y_B)$, where $\Delta h=h_B-h_A$. As shown in FIG. 9, the deformation amount of the spring 9 caused by the movement of the sleeve ring 2 is much smaller than the deformation amount of the spring 9 caused by the movement of the slider 10, so the deformation amount of the spring 9 caused by the movement of the sleeve ring 2 is negligible, namely, $\Delta x_2' \approx 0$, $\Delta x_2' \approx 0$. If $\Delta h>0$, it is indicated that the height of an image at the point B is higher than the height of an image at the point A, the motor 4 drives the slider 10 to move upward through the screw rod 11, such that the deformation amount of the spring 9 is increased by $\Delta x_1$. Thus, a damping force felt by the human hand $F_{elastic1}=k(\Delta x+\Delta x_1)>F_{elastic}$, the human hand feels the increase in damping force in the sliding process and has a feeling of convexity from the point A to the point B. On the contrary, if $\Delta h<0$, it is indicated that the height of an image at the point B is lower than the height of an image at the point A, the motor 4 drives the slider 10 to move downward through the screw rod 11, such that the deformation amount of the spring 9 is decreased by $\Delta x_2$. Thus, a damping force felt by the human hand $F_{elastic2}=k(\Delta x-\Delta x_2)<F_{elastic}$, the damping force is decreased, the human hand feels the decrease in height from the point A to the point B and has a feeling of concavity. Hence, by controlling the motion of the motor 4, the deformation amount $\Delta X$ of the spring 9 is changed, such that the human hand feels changed force feedbacks.

The measurement and control module of the haptic feedback capacitive stylus of the present invention comprises the wireless communication circuitry 14, the control circuitry 6 and the power supply management circuitry 13. When the tip 1 slides on the screen, position information of the tip 1 on the screen is obtained by the mobile terminal through the touch screen, and extraction and calculation of height information of an image at this position are carried out by the mobile terminal. The wireless communication module carried by the mobile terminal itself transmits control information of the vibration frequency and time of the vibration touch module 7 and information of the rotating speed of the motor 4 to the wireless communication circuitry 14 in the measurement and control module of the present invention. After receiving the data from the mobile terminal, the wireless communication circuitry 14 transmits it to the control circuitry 6. The control circuitry 6 is used for analyzing the control information received from the wireless communication circuitry 14 to control the rotating speed of the motor 4 and the vibration frequency and time of the vibration touch module 7, and transmitting the number of rotations of the motor detected by the photoelectric code disc 12 to the mobile terminal via the wireless communication circuitry 14. The power supply management circuitry 13 is capable of detecting electric quantity of the power supply 15, and protecting the power supply 15 from being overcharged in charging and preventing over-discharging of the power supply 15 in use. The electric quantity of the power supply 15 is sent to the mobile terminal via the wireless communication circuitry 14, such that the mobile terminal can display the electric quantity of the capacitive stylus in real time.

In the capacitive stylus of the present invention, the sleeve ring 2, the spring 9, the slider 10, the screw rod 11, and the first housing 3 constitute a force feedback module. The force feedback module is used for generating continuous force feedbacks. The measurement and control module is used for communicating with the wireless module of the mobile terminal and controlling the force feedback module and the vibration touch module 7 according to instructions transferred from the mobile terminal, and managing the power supply 15. The power supply 15 is used for supplying power to the capacitive stylus. The capacitive stylus of the present invention can provide elastic force feedbacks and vibration touch feedbacks. By reading the information from the photoelectric code disc 12 and the rotating speed of the motor 4, a displacement of the slider 10 is calculated. Changes in displacement of the slider 10 lead to deformation of the spring 9, and thus changes in continuous force feedbacks are generated at the sleeve ring 2 hold by fingers.

What is claimed is:

1. A portable haptic feedback capacitive stylus for interaction on a mobile terminal, comprising:
    a tip, a sleeve ring, a first housing, a connecting cylinder, a second housing, an end-portion housing, a motor, a spring, a slider, a screw rod located in the first housing, a photoelectric code disc, a measurement and control module, and a power supply located in the second housing, wherein
    the second housing is fixedly connected between the first housing and the end-portion housing; the first housing comprises a front housing and a rear housing fixedly connected to the front housing wherein the outer diameter of the front housing is smaller than the outer diameter of the rear housing, and a limiting groove disposed in the inner wall of the first housing;
    the tip is fixedly connected to one end of the connecting cylinder, the other end of the connecting cylinder passes through an end-portion through-hole of the front housing within the front housing, the cylinder diameter of the connecting cylinder is smaller than the diameter of the end-portion through-hole of the front housing;
    the sleeve ring is sleeved over the front housing, and the sleeve ring is axially movable along the front housing; a clearance fit is provided between the sleeve ring and the connecting cylinder; the connecting cylinder is connected to one end of the screw rod through a bearing, and the other end of the screw rod is connected to an output shaft of the motor;
    the slider is sleeved over the screw rod, the slider and the screw rod are fit to each other, a lug is provided on the slider and the lug is located in the limiting groove of the first housing;
    one end of the spring is connected to the slider, and the other end of the spring is connected to the sleeve ring;
    the photoelectric code disc is connected to the motor, the measurement and control module is separately connected to the photoelectric code disc and the motor, the power supply supplies power to the measurement and control module and the motor.

2. The portable haptic feedback capacitive stylus for interaction on a mobile terminal according to claim 1, wherein the tip, the connecting cylinder, the bearing, the sleeve ring, the spring, the slider, the screw rod, and the first housing all are made of a conductive material.

3. The portable haptic feedback capacitive stylus for interaction on a mobile terminal according to claim 1, wherein the second housing and the end-portion housing both are made of a nonmetallic material.

4. The portable haptic feedback capacitive stylus for interaction on a mobile terminal according to claim 1, wherein
    the measurement and control module comprises a wireless communication circuitry, a control circuitry, and a power supply management circuitry,
    wherein the control circuitry is separately connected to the wireless communication circuitry and the power supply management circuitry via conducting wires, the power supply management circuitry is connected to the power supply via conducting wires, the wireless communication circuitry is communicatively connected to a wireless communication module in the mobile terminal, and the wireless communication circuitry is used for receiving data from the mobile terminal and transmitting data to the mobile terminal.

5. The portable haptic feedback capacitive stylus for interaction on a mobile terminal according to claim 4, further comprising a vibration touch module, wherein the vibration touch module is located in the second housing, the power supply supplies power to the vibration touch module, and the vibration touch module is connected to the measurement and control module via conducting wires.

6. The portable haptic feedback capacitive stylus for interaction on a mobile terminal according to claim 1, wherein
    the sleeve ring comprises an outer ring, an inner ring, mounting holes, and supporting blocks,
    wherein the inner ring is located in the outer ring, the outer ring and the inner ring are fixedly connected to each other through the supporting blocks, and one of the mounting holes is provided on each of the supporting blocks;
    one end of the spring is sleeved in the mounting holes;
    the first housing is located in a gap between the outer ring and the inner ring, the connecting cylinder is located in a cavity of the inner ring, and a gap is provided between the connecting cylinder and the inner ring.

7. The portable haptic feedback capacitive stylus for interaction on a mobile terminal according to claim 6, wherein the sleeve ring is ring-shaped.

8. The portable haptic feedback capacitive stylus for interaction on a mobile terminal according, to claim 6, wherein open slots are provided on the front housing, a clearance fit is provided between the open slots and the supporting blocks of the sleeve ring, and one end of the first housing passes through the gap between the inner ring and the outer ring of the sleeve ring to be threadedly connected to the tip.

9. The portable haptic feedback capacitive stylus for interaction on a mobile terminal according to claim 8, wherein a length of the open slots is greater than a length of the supporting blocks.

10. The portable haptic feedback capacitive stylus for interaction on a mobile terminal according to claim 8, wherein two supporting blocks are provided and arranged between the outer ring and the inner ring opposite to each other; two open slots are provided on the front housing; and a clearance fit is provided between each of the supporting blocks and one of the open slots.

11. The portable haptic feedback capacitive stylus for interaction on a mobile terminal according to claim 2, wherein the measurement and control module comprises a wireless communication circuitry, a control circuitry, and a power supply management circuitry, wherein the control circuitry is separately connected to the wireless communication circuitry and the power supply management circuitry via conducting wires, the power supply management circuitry is connected to the power supply via conducting wires, the wireless communication circuitry is communicatively connected to a wireless communication module in the mobile terminal, and the wireless communication circuitry is used for receiving data from the mobile terminal and transmitting data to the mobile terminal.

12. The portable haptic feedback capacitive stylus for interaction on a mobile terminal according to claim 3, wherein the measurement and control module comprises a wireless communication circuitry, a control circuitry, and a power supply management circuitry, wherein the control circuitry is separately connected to the wireless communication circuitry and the power supply management circuitry via conducting wires, the power supply management circuitry is connected to the power supply via conducting wires, the wireless communication circuitry is communicatively connected to a wireless communication module in the mobile terminal, and the wireless communication circuitry is used for receiving data from the mobile terminal and transmitting data to the mobile terminal.

* * * * *